3,499,701
ELECTRO-OPTICAL SCANNER
Warren M. Macek, Huntington Station, and Joseph R. Schneider, Larchmont, N.Y., assignors to Sperry Rand Corporation, a corporation of Delaware
Filed Jan. 25, 1966, Ser. No. 522,933
Int. Cl. G02f 1/26
U.S. Cl. 350—150        7 Claims

ABSTRACT OF THE DISCLOSURE

An electro-optical light beam scanning device comprising a plurality of cells each comprising a pair of wedge-shaped crystalline members affixed to one another and oriented in a manner to form a sloping interface relative to a light beam propagating therethrough in a direction substantially aligned with an electric field established along the $Z'$ axis of the crystals, the electric field being effective to induce in the crystals orthogonal $X'$ and $Y'$ axes oriented perpendicular to the $Z'$ axis and operative to differentially control the refractive index of the respective crystals in accordance with variations of the field intensity. In each cell, the $X'$ axis of one member is aligned with the $Y'$ axis of the other member and the adjacent cells are oriented such that the electric fields applied thereto and the sloping interfaces therein are inverted with respect to one another whereupon the deflection of the light beam occurring at each interface is cumulative in the plurality of cells.

---

The present invention generally relates to electrical devices for deflecting a beam of light and, more particularly, to an electro-optical scanner characterized by compactness and very high scanning rates.

With the advent of narrow beam light sources such as lasers and the development of laser applications including information storage and radar-type systems, there has arisen a need for high-speed means for accurately controlling the direction of laser beams in very small and controllable increments. It is also desirable that the deflection means be capable of essentially instantaneous operation so that the laser beam may be deflected to any arbitrary position in a field of scan in minimum time.

It is the principal object of the present invention to provide an electro-optical scanner characterized by compactness and very high speed operation.

Another object is to provide an electro-optical scanner for deflecting a polarized light beam in continuously variable and minute increments.

An additional object is to provide a multi-section electro-optical scanner in which the magnitude of beam deflection in response to a given electric field increment is enhanced.

These and other objects of the present invention, as will appear from a reading of the following specification, are achieved by exploiting the properties of electro-optical materials such as the dihydrogen arsenates and phosphates of ammonium and potassium. In one species of the invention, two prisms are cut from respective cylindrical portions of a potassium dihydrogen phosphate crystal. Each prism is of the shape of a truncated right circular cylinder formed by cutting along a diagonal of the cylinder. The two prisms are aligned relative to each other and subjected to an electric field extending axially in the direction of light propagation so that incident polarized light travels with increased velocity in the first prism and with retarded velocity in the second prism (relative to its velocity in the absence of an electric field). When the two prisms are cemented together so as to form a flat disc (cell), polarized light propagating along the axis of the cell in the direction of the applied electric field is deflected by an amount dependent upon field intensity and in a sense dependent upon field direction. The light beam is undeviated in its traversal through the cell in the absence of an electric field. Provision is made for optically cascading a plurality of identical cells so as to multiply the amount of beam deflection achievable in a single cell without necessitating any increase in the magnitude of the applied electric field.

For a more complete understanding of the present invention, reference should be had to the following specification and to the appended figures of which:

FIGURE 1 is a sketch of a disc of electro-optical material depicting the directions along with propagating polarized light travels with different velocities in the presence of an axial electric field;

FIGURE 2 is a cross-section view of an electro-optical scanner cell;

FIGURE 3 is a cross-sectional view of an electro-optical scanner cell having substantially enhanced deflection sensitivity relative to the scanner of FIGURE 2; and FIGURE 4 is a cross-sectional view of a multi-celled electro-optical scanner for achieving deflection sensitivities beyond that of the scanner of FIGURE 3 without requiring an increase in the applied electric field.

Tetragonal crystals such as ammonium dihydrogen phosphate (ADP) and potassium dihydrogen phosphate (KDP) have a unique direction, termed the optic axis, along which light rays propagate with the same velocity regardless of their polarization. Such crystals are called uniaxial. If a uniaxial crystal such as KDP is placed in an electric field parallel to its optic axis, two new axes are induced which cause the velocity of propagation to become a function of the direction of polarization of light propagating along the optic axis. Thus, said electric field causes the uniaxial crystal to become biaxial; that is, mutually perpendicularly polarized beams propagating along the optic axis travel at respective velocities of propagation. One beam travels at a velocity higher than its velocity in the absence of the electric field whereas the second beam (perpendicularly polarized with respect to the first beam) propagates at a velocity lower than its velocity in the absence of the electric field. The magnitude of the difference between the velocities of the two beams is a function of the magnitude of the electric field whereas the sense of the difference of the velocities is determined by the direction of the electric field.

Referring to FIGURE 1, the numeral 1 generally represents a disc of electro-optical material such as a disc of potassium dihydrogen phosphate. When disc 1 is subjected to an electric field E parallel to the $Z'$ (optic) axis of the crystal, axes $X'$ and $Y'$ are induced which cause respectively polarized light to experience different propagational velocities. In the presence of the electric field, light polarized in the direction of $X'$ propagates through the disc with a higher velocity than light which is polarized along the axis $Y'$. It should be noted that if the direction of the electric field E were reversed, the $X'$ and $Y'$ axes would interchange with the result that light polarized along the original direction of the $X'$ axis (as shown in FIG. 1) would propagate through disc 1 in the $Z'$ direction with a velocity less than light polarized along the original $Y'$ axis direction. It should also be noted that in the absence of the electric field E, the light experiences the same velocity of propagation independent of its direction of polarization.

A beam of polarized light can be deflected by utilizing a wedge-shaped portion of the KDP disc 1 formed by cutting disc 1 along a diagonal plane containing the $X'$ axis but not the $Y'$ or $Z'$ axes. Said portion is represented by the cross-hatched area 2 of the electro-optical scanner cell 3 of FIGURE 2. Cell 3 further comprises a matching wedge of non-electro-optically active material 4 whose fixed index of refraction equals the controllable index of refraction of portion 2 in the absence of an electric field E. Electric field E is established by application of the designated potentials +V and −V, to ring electrodes 5 and 6, respectively. The use of ring electrodes produces a substantially uniform field within the cell whereby the index of refraction is maintained uniform throughout the cross section of the cell. Wedges 2 and 4 are cemented together along interface 7 by means of a conventional transparent adhesive material such as Canada balsam. The exterior faces of cell 3 are coated with anti-reflection coatings 8 and 9.

Incident light rays 10 propagate through cell 3 parallel to the electric field E and normal to the input face of wedge 4. Light rays 10 experience no deflection upon entering wedge 4. In the absence of the electric field E, the velocity of propagation within wedge 2 would be equal to the velocity of propagation within wedge 4 with the result that the light rays 10 would undergo no deflection upon crossing interface 7. There also would be no deflection of the light rays upon emerging in a normal direction through the output face of the cell. The index of refraction of wedge 2 is changed, however, by application of the electric field E. A maximum change in the velocity of propagation (relative to the velocity in the absence of the electric field E) is produced by irradiating cell 3 with light polarized either along the X' or Y' axis of wedge 2. The magnitude of the velocity change is a function of the magnitude of the change in the electric field E whereas the sense of the velocity change is a function of the sense of the change in the electric field E.

It is to be noted that the increment of deflection of the incident polarized light rays 10 in FIGURE 2 produced by a given increment of electric field ΔE depends upon the amount by which the index of refraction of wedge 2 changes in response thereto. A significantly greater increment of deflection can be produced by the same amount of electric field increment ΔE by utilizing the improved cell 11 of FIGURE 3. Wedge 12 of FIGURE 3 is identical in structure and operation to wedge 2 of FIGURE 2. An electric field E is created by application of electric potentials to ring electrodes 13 and 14 as in the case of FIGURE 2. FIGURE 3 differs from FIGURE 2 in that wedge 15 is of the same electro-optic material as wedge 12 so that the index of refraction of wedge 15, as well as the index of refraction of wedge 12 changes in accordance with the magnitude and direction of the electric field E. The wedges 12 and 15 are so cut and then oriented relative to each other in the presence of the electric field E that the X' axis of wedge 12 is in the same direction as the Y' axis of wedge 15 and the Y' axis of wedge 12 is in the same direction as the X' axis of wedge 15. In the view of FIGURE 3, the Y' axis of wedge 12 and the X' axis of wedge 15 are vertical. For example, where wedge 12 results from cutting disc 1 along a diagonal plane containing the X' axis but not the Y' or Z' axes, wedge 15 results from cutting another disc along a diagonal plane containing the Y' axis but not the X' or Z' axes.

In the absence of an electric field E, the index of refraction of wedge 15 would be equal to the index of refraction of wedge 12 so that incident horizontally polarized light rays 16 undergo no deflection upon passing through cell 11. The application of an electric field E induces the X' and Y' axes in each of the wedges 12 and 15. The X' axis designates the direction of polarized light which experiences increased velocity of propagation whereas the Y' axis designates the direction of polarized light which experiences decreased velocity of propagation relative to the velocity of propagation in the wedge in the absence of an electric field E. It should be observed that the increase of velocity of propagation along the X' axis is equal to the decrease in the velocity of propagation along the Y' axis in the same wedge. Inasmuch as the X' and Y' axes of wedges 12 and 15, respectively, extend in the same direction, incident light rays 16 polarized in the direction of said axes travel through wedge 12 with a velocity higher than the velocity experienced in wedge 15 with the result that deflection is produced at interface 17. The magnitude of the deflection depends upon the magnitude of the electric field as in the case of cell 3 of FIGURE 2. However, the magnitude of the deflection for a given increment ΔE is substantially greater in the case of cell 11 than in the case of cell 3 for the reason that the indices of refraction of both wedges 12 and 15 of cell 11 change in opposite directions whereas the index of refraction of one wedge only (wedge 2) changes in cell 3.

The direction of beam deflection produced at interface 17 depends upon the direction of the applied electric field E (which determines whether the velocity in wedge 12 becomes greater than the velocity in wedge 15 or vice versa) and by the slope of interface 17. In the case of the direction of the electric field E and the direction of the slope of interface 17 shown in FIGURE 3, incident horizontally polarized light rays 16 are deflected in the direction represented by exiting light rays 18. For the same condition of input light polarizaton, the same orientation of the X' and Y' axes of wedge 15 relative to the X' and Y' axes of wedge 12, and the same direction of electric field E, the sense with which the emerging light rays 18 are deflected may be inverted by rotating cell 11 180° about the Z' axis. The same effect would result without physically rotating cell 11 by reversing the direction of the electric field E. Both techniques are exploited in the multiple cell embodiment of FIGURE 4 wherein the deflection sensitivity of the electro-optical scanner (increment of beam deflection produced for a given increment of electric field) is multiplied in accordance with the number of cells with which the scanner is constructed.

Each of the cells 19, 20, 21 and 22 comprising the multiple cell scanner is identical to cell 11 of FIG. 3. Cells 19 and 21 are positioned within the composite structure with the same orientation of cell 11 whereas cells 20 and 22 are rotated about the Z' axis 180° relative to cells 19 and 21. The same magnitude of electric field E is applied to each of cells 19, 20, 21 and 22. However, the ring electrodes 23, 24, 25, 26 and 27 are so energized that the resulting axial electric fields reverse in direction within the successive cells. That is, the electric field in cells 19 and 21 are as shown in FIG. 3 whereas the electric fields in cells 20 and 22 are reversed with respect thereto. The successive cells are bonded to each other by the same transparent adhesive utilized in fixing two wedges comprising each cell. Canada balsam is suitable for this purpose. The ring electrodes 23, 24, 25, 26 and 27 are encapsulated in insulated spaced relationship by means of electrical insulating ring 28.

The operation of cell 19 is the same as that previously described with respect to cell 11 of FIG. 3. The 180° physical rotation about axis Z' of cell 20 relative to cell 19 produces no net change in the direction of the X' and Y' axes of cell 20 relative to the axes of cell 19 with the consequence that the incident horizontally polarized light rays 29 experience the same velocity of propagation within wedge 31 as in wedge 30. However, the velocity of propagation changes when the light rays travel within wedge 32. Consequently, the light rays experience deflection when they traverse interface 33 for the same reason that deflection is produced at interface 34 within cell 19 and at interface 17 within cell 11 of FIG. 3. It is to be noted that the slope of interface 33 is opposite in sense to the slope of interface 34 and that the direction of the electric field within cell 20 is opposite to the direction of the electric field within cell 19. The double reversal, i.e., the reversal in the slope of the interface and the reversal in the direction of the electric field, is mutually cancelling in effect with the result that the incident light rays 29 are deflected at interface 33 in the same sense as they are deflected at interface 34. Equivalent deflection of the light rays occurs at interfaces 35 and 36 of cells 21 and 22, respectively. Thus, all of the deflections experienced at interfaces 34, 33, 35 and 36 are cumulative with the total deflection experienced by the output rays 37 being equal in magnitude to the deflection produced by one cell multiplied by the number of cells utilized in the composite structure.

It will be observed that four cells have been shown in the composite structure of FIG. 4 by way of example only, there being no restriction as to the number of cells that may be employed in a given application. Among the important features of the composite structure are its integral and rigid nature and ease with which the required successively reversing electric fields may be established in the multi-celled structure.

What is claimed is:

1. An electro-optical scanner comprising
    first and second wedge-shaped members of electro-optically active material in which X' and Y' axes are induced by application of an electric field directed along the optic axis Z' of said members, said X', Y' and Z' axes being mutually perpendicular and the velocity of light polarized along X' being different than the velocity of light polarized along Y',
    said second member being fixed to said first member to form a first electro-optical scanner cell wherein the Z' axis is oriented transverse to the interface of the respective wedge-shaped members and the X' axis of said second member and the Y' axis of said first member have the same direction,
    means for illuminating said cell with incident polarized light parallel to said Z' axis, said light being polarized perpendicularly to said Z' axis, and
    means for establishing an electric field in said cell parallel to said Z' axis.

2. An electro-optical scanner as defined in claim 1 wherein said incident light is polarized along one of said X' and Y' axes of said cell.

3. An electro-optical scanner as defined in claim 1 wherein said second member is of the same material as said first member.

4. An electro-optical scanner as defined in claim 1 wherein each of said first and second members is a truncated right circular cylinder, and
    said means for establishing said electric field comprises annular electrodes fixed to said first and second members.

5. An electro-optical scanner as defined in claim 1 and further including
    at least one additional electro-optical scanner cell identical to said first cell, thereby providing a plurality of electro-optical scanner cells cascaded along said Z' axis,
    each alternate cell of said plurality of cells being physically rotated 180° about said Z' axis relative to said first cell,
    each other cell of said plurality of cells having the same orientation as that of said first cell,
    said means for establishing said electric field producing an electric field in said first cell and each even numbered additional cell in a first direction and producing an electric field in each odd numbered additional cell in a direction opposite to said first direction.

6. An electro-optical scanner as defined in claim 5 wherein said second member of each cell is of the same material as said first member.

7. An electro-optical scanner as defined in claim 6 wherein each said first and second member of each cell is a truncated right circular cylinder, and
    said means for establishing said electric field comprises annular electrodes fixed to said first and second members.

References Cited

UNITED STATES PATENTS

| | | | |
|---|---|---|---|
| 3,040,625 | 6/1962 | Zito | 350—150 X |
| 3,295,912 | 1/1967 | Fleisher et al. | 350—150 |
| 3,305,292 | 2/1967 | Miller | 350—150 |
| 3,313,938 | 4/1967 | Peters | 350—150 X |

DAVID SCHONBERG, Primary Examiner

P. R. MILLER, Assistant Examiner

U.S. Cl. X.R.

350—160

March 17, 1970     E. BERNAL G ET AL     3,501,220
MULTIDIMENSIONAL OPTICAL DATA DISPLAY APPARATUS
Filed April 24, 1967     2 Sheets-Sheet 1
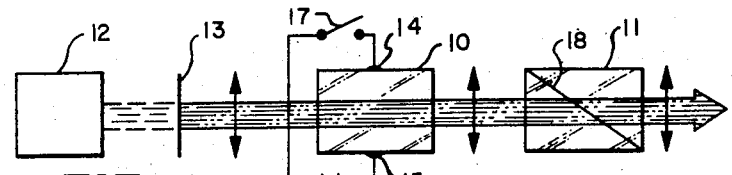
FIG. 1
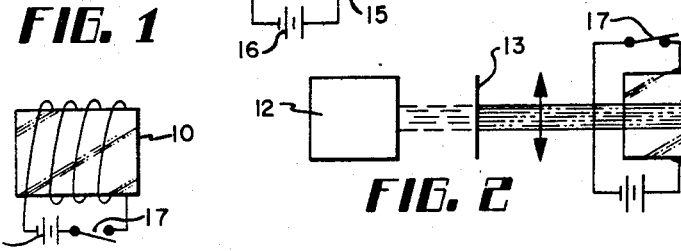
FIG. 2
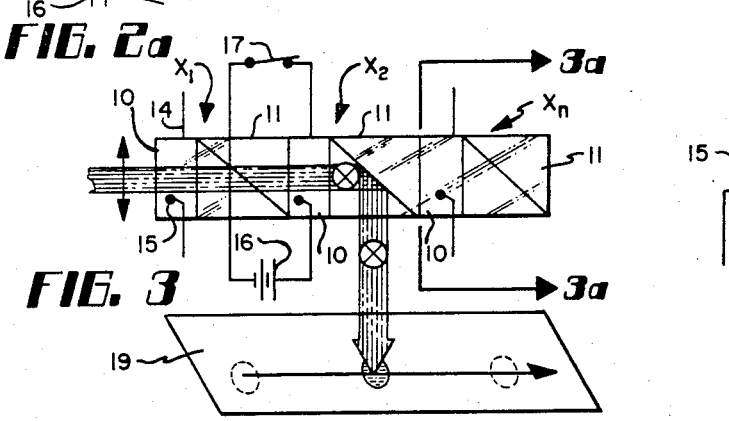
FIG. 2a
FIG. 3
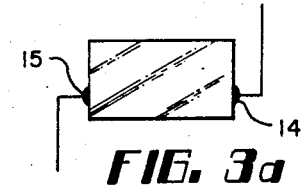
FIG. 3a
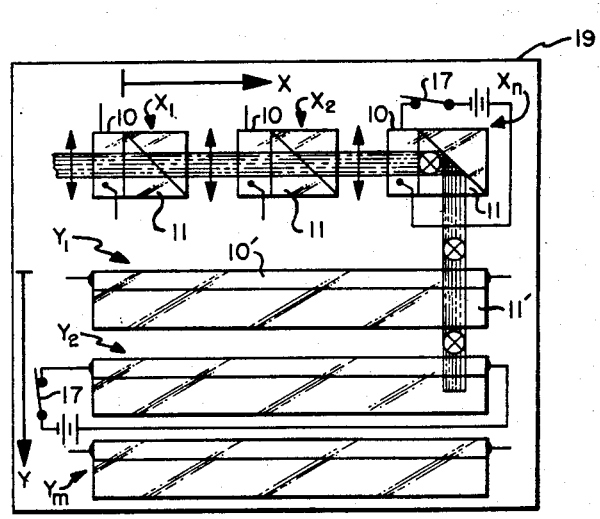
FIG. 4
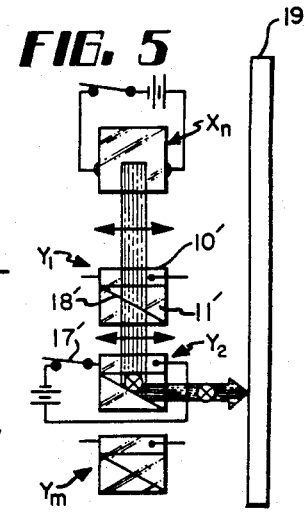
FIG. 5
INVENTOR.
ENRIQUE BERNAL G.
DI CHEN
WAYNE L. WALTERS
BY
ATTORNEY